United States Patent
Bardhan et al.

(10) Patent No.: US 6,994,972 B2
(45) Date of Patent: Feb. 7, 2006

(54) POROUS SUBSTRATES FOR DNA ARRAYS

(75) Inventors: Pronob Bardhan, Corning, NY (US); Dana C. Bookbinder, Corning, NY (US); Joydeep Lahiri, Painted Post, NY (US); Cameron W. Tanner, Horseheads, NY (US); Patrick D. Tepesch, Corning, NY (US); Raja R. Wusirika, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/101,144

(22) Filed: Mar. 18, 2002

(65) Prior Publication Data

US 2002/0142339 A1    Oct. 3, 2002

Related U.S. Application Data

(63) Continuation-in-part of application No. 09/650,885, filed on Aug. 30, 2000, now abandoned.

(60) Provisional application No. 60/152,186, filed on Sep. 2, 1999.

(51) Int. Cl.
*C12Q 1/68*     (2006.01)
*C12M 1/36*    (2006.01)
*G07N 15/06*   (2006.01)
*C07H 21/04*   (2006.01)

(52) U.S. Cl. .................... 435/6; 435/7.1; 435/174; 435/283.1; 435/287.2; 422/68.1; 536/23.1

(58) Field of Classification Search ............ 435/6, 435/7.1, 174, 283.1, 287.2; 422/68.1; 536/23.1
See application file for complete search history.

(56) References Cited

U.S. PATENT DOCUMENTS

4,544,395 A    10/1985  Evans .................... 65/60.3
4,672,040 A *   6/1987  Josephson ............... 436/526

(Continued)

OTHER PUBLICATIONS

M. Glazer et al., "High Surface Area Substrates for DNA Arrays", Mat. Res. Soc. Symp. Proc. vol. 576, 1999 Materials Research Society, pp. 371-375.

(Continued)

*Primary Examiner*—B J Forman
(74) *Attorney, Agent, or Firm*—Joanne N. Pappas

(57) ABSTRACT

A planar, rigid substrate made from a porous, inorganic material coated with cationic polymer molecules for attachment of an array of biomolecules, such as DNA, RNA, oligonucleotides, peptides, and proteins. The substrate has a top surface with about at least 200 to about 200,000 times greater surface area than that of a comparable, non-porous substrate. The cationic polymer molecules are anchored on the top surface and in the pores of the porous material. In high-density applications, an array of polynucleotides of a known, predetermined sequence is attached to this cationic polymer layer, such that each of the polynucleotide is attached to a different localized area on the top surface. The top surface has a surface area for attaching biomolecules of approximately 387,500 $cm^2/cm^2$ of area (~7.5 million $cm^2$/ 1×3 inch piece of substrate). Each pore of the plurality of pores in the top surface of the substrate has a pore radius of between about 40 Å to about 75 Å. Not only does the cationic coating in and over the pores of the substrate greatly increase the overall positive charge on the substrate surface, but also given the size of the pores provides binding sites to which biomolecules can better attach.

9 Claims, 2 Drawing Sheets

U.S. PATENT DOCUMENTS

| | | | |
|---|---|---|---|
| 4,839,231 A | * | 6/1989 | Vandekerckhove .......... 428/441 |
| 5,024,765 A | * | 6/1991 | Linder et al. ................ 210/651 |
| 5,770,722 A | | 6/1998 | Lockhart et al. ........... 536/25.3 |
| 5,807,522 A | | 9/1998 | Brown et al. ................. 422/50 |
| 5,843,789 A | | 12/1998 | Nomura et al. ............. 436/164 |
| 5,919,523 A | * | 7/1999 | Sundberg et al. ........... 427/333 |
| 5,959,098 A | * | 9/1999 | Goldberg et al. .......... 536/25.3 |
| 6,004,752 A | | 12/1999 | Loewy et al. .................. 435/6 |
| 6,214,366 B1 | * | 4/2001 | Prusiner et al. ............. 424/405 |
| 2004/0092396 A1 | * | 5/2004 | Glazer et al. ............... 502/439 |

OTHER PUBLICATIONS

Thomas H. Elmer, "Porous and Reconstructed Glasses", Engineered Materials Handbook, vol. 4, The Materials Information Society, pp. 427-432, no date provided.

* cited by examiner

POROUS SUBSTRATES FOR DNA ARRAYS

The present Application claims the benefit of priority as a continuation-in-part to U.S. patent application Ser. No. 09/650,885 now abandoned filed on Aug. 30, 2000, which claims benefit of priority to U.S. patent application Ser. No. 09/562,829, filed on May 1, 2000, now abandoned. The contents of both of the aforementioned patent applications are incorporated herein by reference.

BACKGROUND OF THE INVENTION

High-density arrays (HDAs) are new tools used by drug researchers and geneticists to provide information on the expression of genes. A high-density array typically comprises between 5,000 and 50,000 probes in the form of single stranded DNA, each of a known and a different sequence, arranged in a predetermined pattern on a substrate. The arrays are used to test whether single stranded target DNA sequences interact or hybridize with any of the single stranded probes on the array. The testing procedure consists of printing and binding single-stranded DNA molecules onto a substrate. The substrate may be any size, but typically takes the form of a standard 1×3 inch microscope slide. The printed DNA sequence is for a known genetic risk factor and may be tagged with a fluorescent marker for identification. Unknown, single-stranded DNA, such as obtained from a patient, is tagged with a different fluorescent marker and washed over the slide for a specified period of time and then rinsed. If the unknown DNA contains any strands that have complementary nucleic acid sequences to the known strand, hybridization occurs. Any hybridization on the rinsed slide is detected as fluorescence from the marker on the unknown DNA. Fluorescence above a predetermined, threshold intensity indicates that the unknown DNA contains that risk factor associated with the known DNA printed on the slide.

After exposing the array to target sequences under selected test conditions, scanning devices can examine each location on the array and determine the quantity of targets that are bond to complementary probes. The ratio of fluorescent intensity at each spot on the high-density array provides the relative differential expression for a particular gene. DNA arrays can be used to study the regulatory activity of genes, wherein certain genes are turned on or "up-regulated" and other genes are turned off or "down-regulated." So, for example, a researcher can compare a normal colon cell with a malignant colon cell and thereby determine which genes are being expressed or not expressed in the aberrant cell. The regulatory cites of genes serves as key targets for drug therapy.

Proper performance of a DNA array depends on two basic factors: 1) retention of the immobilized probe nucleic sequences on the substrate, and 2) hybridization of the target sequence to the immobilized probe sequence, as measured by fluorescence emission from the tagged target sequence. The DNA probe material must be retained on the surface of the substrate through a series of washing, blocking, hybridizing, and rinsing operations that are commonplace in DNA hybridization assays. An excessive loss of probe DNA sequences can lead to a low fluorescent-signal-to noise ratio and uncertain or erroneous results.

DNA arrays have for years been printed onto organic, micro-porous membranes such as nylon or nitrocellulose. The densities at which one can print DNA solutions onto these types of organic micro-porous membranes is limited because of the tendency for the DNA solution to wick laterally through the membrane, thus causing cross-talk and contamination between adjacent locations. Others have employed a flat, non-porous substrate surface made from glass. (See for example, U.S. Pat. No. 5,744,305, incorporated herein by reference.) These substrates, however, have also been found wanting, since they do not retain the probe molecules as well as porous substrates.

The present invention proposes to use a substantially flat, porous, inorganic substrate surface that is specially treated with cationic polymer coating to enhance retention of nucleic moieties for high-density arrays. The porous surface provides increased surface area for immobilizing DNA probe molecules, which increases the density of DNA binding sites per unit cross-sectional area of the substrate. The increased number of possible binding sites per unit area results in greater retention of immobilized DNA probes and the emission of an increased signal when hybridized with target molecules.

SUMMARY OF THE INVENTION

The present invention relates to a biological analysis device, which comprises a planar, rigid substrate made from a porous, inorganic material with a top surface having about at least 200 to about 200,000 times greater surface area than that of a comparable, non-porous substrate. The substrate can be employed to fabricate high-density arrays. A layer of cationic polymer molecules is anchored on the top surface and in the pores of the porous material. The cationic polymers allow for the attaching of an array of biomolecules such as DNA, RNA, oligonucleotides, peptides, and proteins. In high-density applications, an array of polynucleotides of a known, predetermined sequence is attached to this cationic polymer layer, such that each of the polynucleotide is attached to a different localized area on the top surface.

The top surface has a surface area for attaching biomolecules of approximately 387,500 $cm^2/cm^2$ of area (~7.5 million $cm^2$/1×3 inch piece of substrate). Each pore of the plurality of pores in the top surface of the substrate has a pore radius of between about 40 Å to about 70 Å. The top surface is composed of a borosilicate glass. A layer of cationic polymer is applied and attached either by electrostatical means or by means of dip-coating to the top surface. The cationic polymer is, for instance, either polylysine, polyethylene-imine, polybrene, or γ-amino-propyltriethoxysilane. Not only does the cationic coating in and over the pores of the substrate greatly increase the overall positive charge on the substrate surface, but also given the size of the pores provides binding sites to which biomolecules can better attach.

The invention also relates to a method of preparing a porous glass substrate for attaching biomolecules. The method comprises the steps of providing a porous glass having pores each between about 40 Å to about 75 Å in size; applying electrostatically a layer of cationic polymer to a top surface of said glass at an acidic pH value—typically a pH of about 0 or 1–6; then washing and drying the glass; and heating the glass to about 140–175° C. to cross-link free silanol groups. The cationic polymer molecules coat not only the top surface of the porous substrate, but also the surfaces of the plurality of interconnected channels and voids that extend within the substrate.

DETAILED DESCRIPTION

Figure 1:
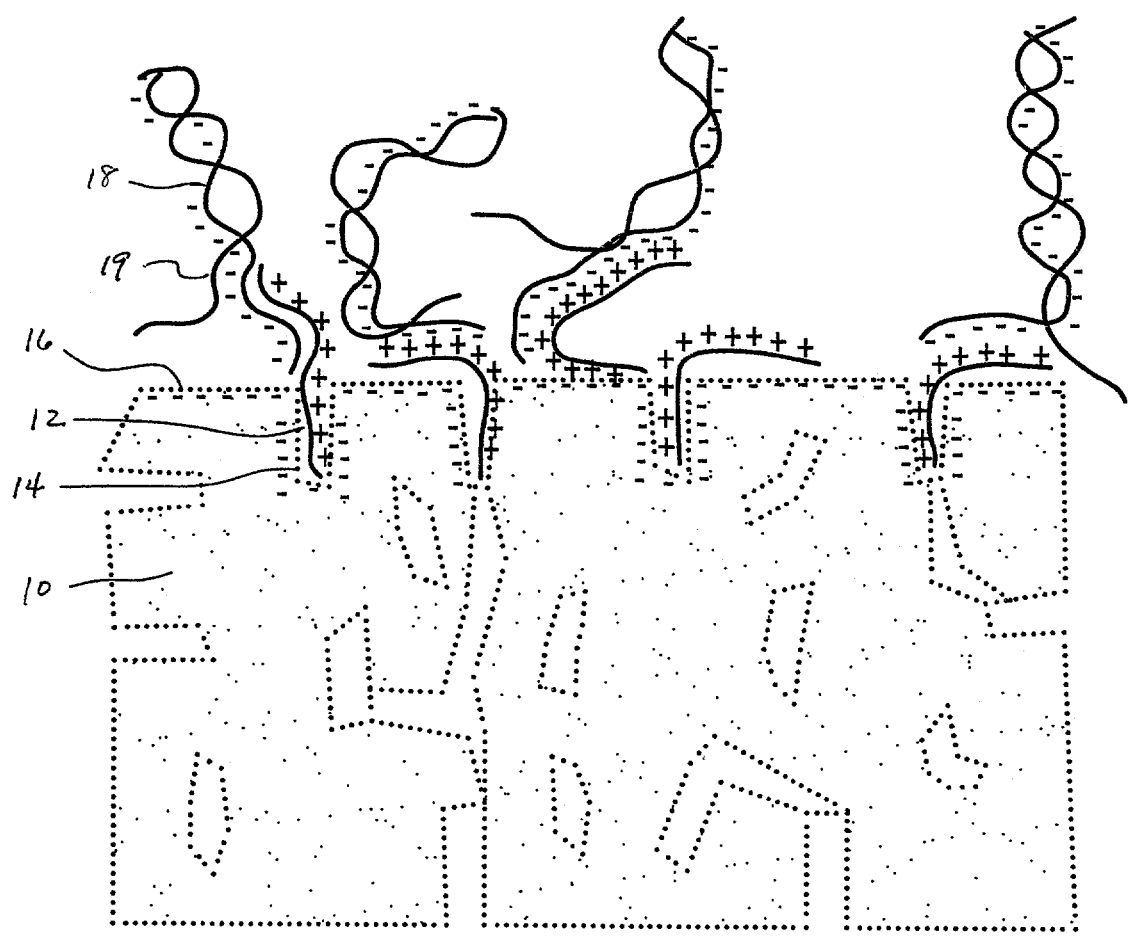
FIG. 1 is a schematic cross-sectional representation of a porous substrate of the present invention with double stranded DNA molecules attached to the substrate by means of electrostatic interaction with a cationic polymer.

Open celled porous glasses having the desirable properties of fused silica have been applied for various uses. Such glasses are produced using a unique process that circumvents the needs for high temperatures in melting and forming, which affords cost and manufacturing savings. According to the process, a relatively soft alkali borosilicate glass preform is melted in a convention manner and is then pressed, drawn or blown into the desired shape by standard processes used in glass production. The resulting workpiece, which occasionally is given additional finishing operations, is subjected to a heat treatment above the annealing point but below the temperature that would produce deformation of the glass. Two continuous closely intermingled glassy phases are produced during the heat treatment. One phase, which is rich in alkali and boric oxide, is readily soluble with acid. The other phase, which is rich in silica, is insoluble. After the workpiece is immersed in a hot dilute acid solution, the soluble phase is dissolved, leaving behind a fine, porous, high-silica lattice or spider-web-like shell (96% silica). The resulting porous silica article is commonly known as thirsty glass (commercially known as Vycor®, Code 7930, by Corning Inc.).

Porous glasses, like Vycor®, are mechanically strong, hard, non-flaking, and chemically inert. The open network permits selective permeability. Pore size in the glass varies, generally ranging between 40–200 Å, but are preferable used from 40 Å to 60 Å or 70 Å Pore size distribution in a piece of glass is typically very narrow (±3 Å from average pore radius). The pore size may be adjusted as desired, for example, by dissolving the glass with a weakly reactive fluorine-containing compound. See generally, T. H. Elmer, "Porous and Reconstructed Glasses," ENGINEERED MATERIALS HANDBOOK, Vol. 4, Ceramics and Glasses, pp. 427–32, ASM International (1992), incorporated in its entirety herein by reference.

Due to its porosity, a material like Vycor® has an internal surface area of approximately 250 square meters per gram. A Vycor® glass slide weighing approximately 3 grams has ~7.5 million $cm^2$ of 1×3 inch surface area (alternatively, 2.5 million $cm^2/cm^2$). Comparatively, a non-porous glass slide of the same dimensions has only about 40 $cm^2$ of surface area—a difference of a factor of 200,000 for biomolecule attachment. Alternatively, the porous substrate can be characterized as having a plurality of interconnected voids of a predetermined mean size of about 40 Å or 50 Å dispersed therethrough, and having void channels that extend through to a top surface of the porous substrate.

According to the present invention, a porous glass slide is used as a substrate for immobilizing biomolecules, in particular DNA (e.g., cDNA or oligonucleotides). The porous inorganic substrate of the present invention can be treated with cationic polymers (i.e., polymers having a multiplicity of ionic or ionizable functional groups having a positive charge) to advantageous effect. A non-exhaustive list of examples of cationic polymers that may be suitable for use as coatings on the porous glass substrate include: polylysine and corresponding copolymers with neutral amino acids, polyethylene-imine, polybrene, aminosilanes such as γ-amino-propyltriethoxysilane (GAPS), cationic dendrimers or star polymers, and polyvinylamine.

Coating a porous inorganic substrate with cationic polymers has several advantages over cationic coatings on flat nonporous substrates. First porous glass substrates have a greater surface area and therefore have more surface-exposed silanol groups. Consequently, the negatively charged silanol groups can bind to greater amounts of the positively charged cationic species (e.g., amino silanes, polylysine, cationic dendrimers) by electrostatic interactions. This greater density of positive charge lends to greater retention of the negatively charged DNA molecules.

Second, the electrostatic interaction between DNA molecules and cationic polymer coating is stronger for a porous glass substrate than the same interaction on a nonporous glass substrate because of the greater local availability of exposed silanol groups for electrostatic binding per cationic polymer molecule. Further, the narrow pore sizes (~40–75 Å) create an environment of tightly bound water molecules which produces lower dielectric constants. This microenvironment is likely to greatly enhance the strength of the electrostatic interactions between silanol groups and cationic polymer molecules.

Third, displacement of the cationic polymer from the upper-most surface of the porous glass substrate does not necessarily result in complete displacement of the polymer from the substrate. As illustrated in FIG. 1, the cationic polymer molecules 12 remain attached to the substrate 10 by its tail within pores 14 even if most of the polymer coating is removed from the surface 16. It is also thought that this type of dynamic equilibrium can enhance DNA hybridization by serving to extend the probe DNA strand 18, which is bound to the polycation 12, off of the substrate surface 16 into solution, thus eliminating steric interference to hybridization by the substrate.

To facilitate the entry of cationic polymer further into the pores of the particular substrate described above, the polymer is first dissolved in a buffer at a pH above the $pK_a$ of the amino group. This prevents electrostatic bonding of the polymer to the flat upper surface of the substrate. Only after the polymer is equilibrated with the porous substrate is the pH is lowered to make the polymer bind electrostatically. A substrate prepared according to this fashion should have a higher signal to noise (S/N) ratio than conventional primary coatings consisting of aminosilanes (e.g., CVD GAPS) on porous substrates. The pores of the substrate would be sterically blocked by the cationic polymer, leading to reduced amounts of non-specific binding of DNA to the substrate.

Moreover, the cationic polymer-coated porous glass substrate of the present invention is compatible with existing probe-retention and target DNA-hybridization protocols. For instance, addition of probe DNA can be followed by blocking of the substrate with a deactivator (e.g., succinic anhydride or anionic polymers: polyglutamic acid, polyacrylic acid, anionic dendrimers, heparin, etc.), which would confer a net negative charge to the substrate surface. This modification of the substrate would reduce non-specific binding of target DNA strands and reduce background signal either by electrostatic or steric repulsion.

EXAMPLE

A number of 1×3 inch×1 mm porous glass slides (Vycor®, Corning Code 7930) were coated with gama-amino-propyltriethoxylsilane (GAPS) using a 1.0% aqueous solution of GAPS at a pH of 4.0, adjusted using acetic acid. Generally, the treatment can be applied at any acidic pH value. Applicable pH values will range typically between about 5 or 6 to about 2 or 1, more preferably about 3 or 4. The coatings were done by completely immersing each slide in the silane solution (dip-coating) for about 30 minutes. The coated slides were then washed thoroughly with distilled water and dried. The slides were then heated to 160° C. in order to cross-link any free silanol groups. Temperatures can range from about 140–175° C., but more typically between 150–170° C.

Next, a water and glycerin solution containing Cy3-labeled single stranded 80-mer oligonucleotides in a concentration of 1 picomole oligo per microliter was printed using a micropipette onto the treated slide surface. The printed slide was heated in humidity for one hour at 55° C. The slides were then washed twice with 5×SSC and 0.1% SDS at 55° C. to remove any unattached or unbonded DNA. The slides were then treated with a solution of succinic anhydride dissolved in DMF for blocking.

The single stranded DNA immobilized on the blocked slides were next hybridized with Cy5-labeled complimentary DNA sequences 19 at 55° C. using a probe-clip press-seal incubation chamber in a hybridization buffer (Boehringer Mannheim, Cat. # 1717473). The slides were then scanned using a fluorescence detection scanner (Scan Array 3000, General Scanning Inc.). The slides were scanned twice. First, the slides were scanned for Cy-3 prior to hybridization with the complimentary oligonucleotides, and again for Cy-5 after hybridization.

Results

Figure 2:
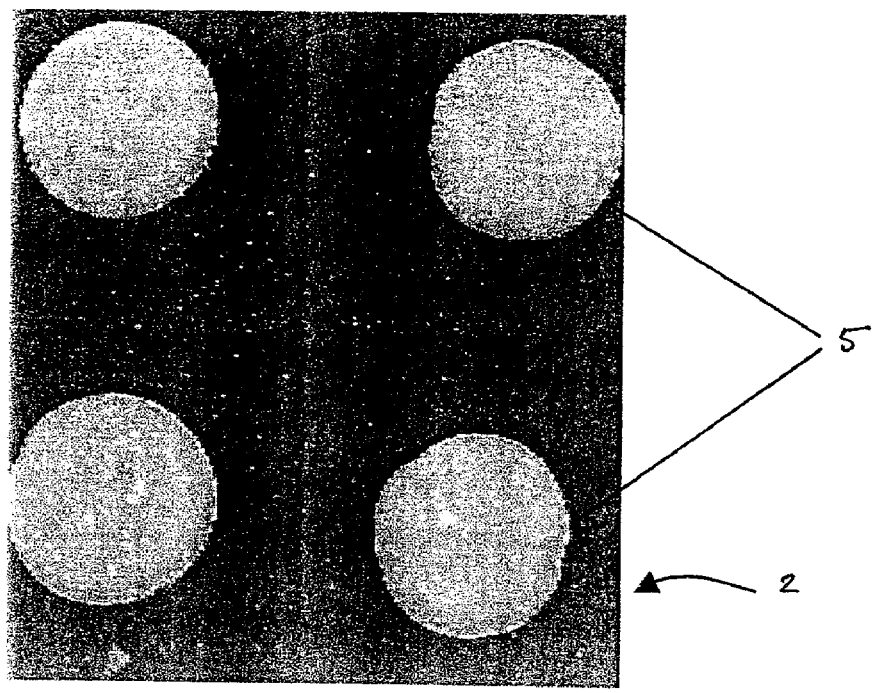
FIG. 2 is a fluorescence scan image of spotted single stranded Cy3-labeled DNA on a porous glass substrate according to the present invention.
Figure 3:
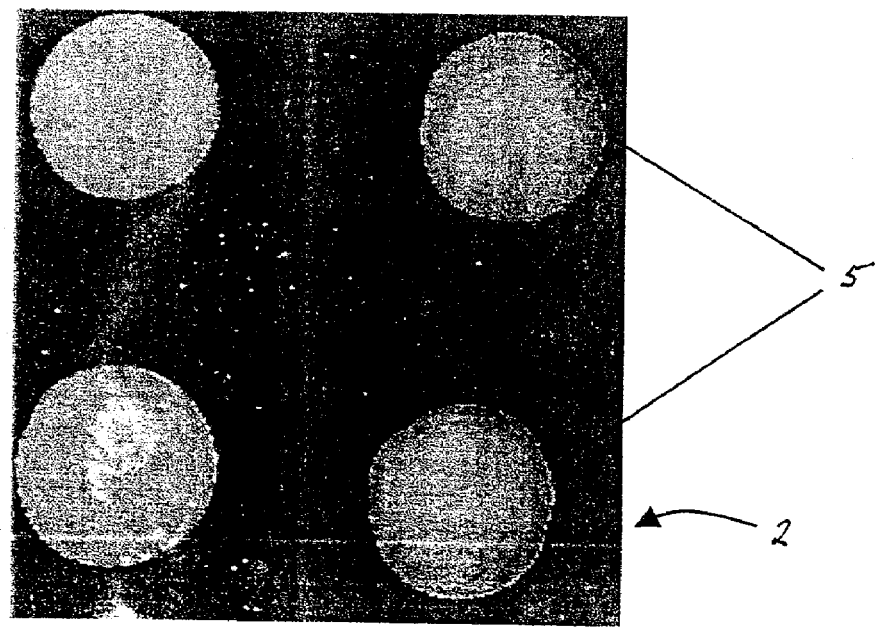
FIG. 3 is a fluorescence scan image of spotted single stranded Cy3-labeled single-stranded DNA that has hybridized to an immobilized, complimentary single stranded DNA sequence.

FIG. 2 shows a Cy-3 scan of a sample slide 2 prior to hybridization, and after the two washings with 5×SSC and 0.1% SDS at 55° C. As shown, the signal strength from the four spotted regions 5, indicates significant oligonucleotide immobilization. FIG. 3 shows a Cy5 scan of the same sample slide 2 after hybridization with complimentary labeled oligonucleotides. As shown, the signal strength from the spotted regions 5 indicates detectable hybridization. This event suggests continued retention of the probe to the porous glass surface even after blocking and washing steps.

The present invention has been described by way of example, and those skilled in the art will understood that the invention is not necessarily limited to the embodiments specifically disclosed, and that various modifications and variations can be made without departing from the spirit and scope of the invention. Therefore, unless changes otherwise depart from the scope of the invention as defined by the following claims, they should be construed as included herein.

We claim:

1. A method for preparing a planar, rigid porous glass substrate for attachment of biomolecules, the method comprising:
    treating a porous glass substrate with a cationic polymer wherein the step of treating said porous glass substrate further comprises:
    coating said porous glass substrate by applying a layer of cationic polymer, the cationic polymer having at least one amino group and dissolved in a buffer at a pH above the pKa of the amino group;
    washing said porous glass substrate such that said cationic polymer electrostatically interacts with pores and surface of said porous glass substrate;
    rinsing said porous glass substrate with water; and
    drying said porous glass substrate.

2. The method according to claim 1 wherein drying comprises the step of heating said porous glass substrate to about 140–1750 C to cross-link free silanol groups.

3. The method according to claim 1, wherein said pores of said porous glass substrate ranges in size of between 40–200 l.

4. The method according to claim 2, wherein the temperature to which said porous glass substrate is heated is about 150–170° C.

5. The method according to claim 1, wherein said cationic polymer is applied by means of dip-coating.

6. The method according to claim 1, wherein said cationic polymer includes at least one of the following: polylysine, polyethylene-imine, aminosilanes, cationic dendrimers, star polymers, and polyvinylamine.

7. The method according to claim 1, wherein said cationic polymer is either polylysine or polyethylene-imine.

8. The method according to claim 1, wherein said cationic polymer is y-amino-propyltriethoxysilane.

9. The method according to claim 1, further comprising the step of attaching biomolecules to said porous glass substrate, said biomolecules are selected from the group consisting of: DNA, RNA, oligonucleotides, peptides, and proteins.

* * * * *